United States Patent
Cheng et al.

(10) Patent No.: US 9,104,904 B2
(45) Date of Patent: Aug. 11, 2015

(54) DISPARITY ESTIMATION METHOD OF STEREOSCOPIC IMAGE

(71) Applicant: Acer Incorporated, New Taipei (TW)

(72) Inventors: Chao-Chieh Cheng, Hsinchu (TW); Tian-Sheuan Chang, Hsinchu (TW)

(73) Assignee: Acer Incorporated, New Taipei (TW)

( * ) Notice: Subject to any disclaimer, the term of this patent is extended or adjusted under 35 U.S.C. 154(b) by 137 days.

(21) Appl. No.: 13/950,271

(22) Filed: Jul. 24, 2013

(65) Prior Publication Data

US 2014/0254918 A1    Sep. 11, 2014

(30) Foreign Application Priority Data

Mar. 7, 2013    (TW) .............................. 102108061 A

(51) Int. Cl.
*G06K 9/00* (2006.01)
*G06T 7/00* (2006.01)

(52) U.S. Cl.
CPC .......... *G06K 9/00201* (2013.01); *G06T 7/0022* (2013.01); *G06T 7/0075* (2013.01); *G06T 2207/10012* (2013.01); *G06T 2207/20228* (2013.01)

(58) Field of Classification Search
CPC .................... G06T 7/0075; G06T 2207/10012
See application file for complete search history.

(56) References Cited

U.S. PATENT DOCUMENTS

| 8,019,146 B2* | 9/2011 | Koo et al. ...................... 382/154 |
| 8,737,723 B1* | 5/2014 | Kwatra ......................... 382/154 |
| 2011/0285701 A1* | 11/2011 | Chen et al. ..................... 345/419 |
| 2013/0182945 A1* | 7/2013 | Kim et al. ...................... 382/154 |

OTHER PUBLICATIONS

Faysal Boughorbel, "A New Multiple-Windows Depth From Stereo Algorithm for 3D Displays," 3DTV Conference, 2007, May 7-9, 2007, pp. 1-4.
Donghyun Kim, et al., "Depth Boundary Reconstruction Method Using the Relations with Neighboring Pixels," 2013 IEEE International Conference on Consumer Electronics (ICCE), Jan. 11-14, 2013, pp. 466-467.
"Office Action of Taiwan Counterpart Application," issued on Mar. 20, 2015, pp. 1-10.

* cited by examiner

*Primary Examiner* — Barry Drennan
*Assistant Examiner* — Jonathan S Lee
(74) *Attorney, Agent, or Firm* — Jianq Chyun IP Office

(57) ABSTRACT

A disparity estimation method of stereoscopic image is provided. A matching cost computation is executed for a first image and a second image, and one extreme value is selected from cost values corresponding to estimating disparities for each pixel to obtain a matching point corresponding to each pixel. And a matching disparity corresponding to each matching point is adjusted based on edge detection according to a scan order.

12 Claims, 6 Drawing Sheets

DISPARITY ESTIMATION METHOD OF STEREOSCOPIC IMAGE

CROSS-REFERENCE TO RELATED APPLICATION

This application claims the priority benefit of Taiwan application serial no. 102108061, filed on Mar. 7, 2013. The entirety of the above-mentioned patent application is hereby incorporated by reference herein and made a part of this specification.

BACKGROUND

1. Field of the Invention

The present disclosure is directed to a stereo vision technique and more particularly, to a disparity estimation method of stereoscopic images.

2. Description of Related Art

Stereo vision technology is widely applied in various fields in recent years. Generally speaking, the stereo vision includes two stages. In an earlier stage, a disparity map between two images is calculated by using stereo matching, and through trigonometric computations, a depth map may be obtained. In a later stage, images of different viewing angles are produced by using the depth map.

In the earlier stage, disparity estimation includes four steps, matching cost computation, cost aggregation, disparity selection and optimization, and disparity correction. The matching cost computation step is used to find out differences (which are referred to as cost values) between two images (e.g., a left-eye image and a right-eye image). In the cost aggregation step, a cost value adjustment is performed according to the cost values of adjacent pixels by using the cost aggregation method so as to enhance the relation between the pixels and reliability of the cost values. After an accumulated cost value is obtained, the disparity selection and optimization step is performed by using the cost values.

Typically, in the disparity optimization step, an energy function is used for the disparity optimization. The energy function is $E(d)=E_{data}(d)+E_{smooth}(d)$. Therein, $E_{data}$ represents a cost value, $E_{smooth}$ is an additional cost value obtained with the consideration of relationship between pixels. And, algorithms for deciding the $E_{smooth}$ may include a graph-cut (GC) algorithm, a belief propagation (BP) algorithm, and a dynamic programming (DP) algorithm. However, when performing the disparity optimization step, an order for calculation is from left to right for the entire row, from right to left, and then from top to bottom. Accordingly, during the calculation process for the disparity selection and optimization, the cost values of the whole image has to be loaded into the memory for calculation. However, since the aggregated cost value is quite large, not only a large amount of computations have to be executed, but also a large amount of memory spaces is needed, which lead to a heavy burden when the real-time processing is required by the conventional technology.

SUMMARY

The present disclosure provides a disparity estimation method of stereoscopic images capable of reducing computation times of disparity optimization and obtaining better matching disparities so as to dramatically reduce computation amount.

The present disclosure further provides a disparity estimation method of stereoscopic images capable of reducing the usage of memory buffers by improving a scan order.

An embodiment of the present disclosure is directed to a disparity estimation method of stereoscopic image, adapted to an electronic apparatus. The method includes executing a matching cost computation on a first image and a second image to obtain a plurality of cost values of each of a plurality of pixels of the first image corresponding to the second image within a disparity search range, wherein a size of the first image is identical to that of the second image; selecting an extreme value from the cost values corresponding to each of the pixels and using the extreme value as a matching cost value to obtain a matching point corresponding to each of the pixels, wherein each of the matching points has a corresponding matching disparity; and adjusting the matching disparity corresponding to each of the matching points according to a scan order. The step of adjusting the matching disparity corresponding to each of the matching points according to the scan order includes: reading disparity data of the matching point corresponding to each of the pixels individually according to the scan order and executing a first computation through a first energy function based on edge detection according to the read disparity data of a current pixel and the read disparity data of pixels adjacent to the current pixel; and executing a second computation through a second energy function based on the edge detection according to the disparity data of a currently processed pixel and the disparity data of the pixels adjacent to the currently processed pixel.

Another embodiment of the present disclosure is directed to a disparity estimation method of stereoscopic images, adapted to an electronic apparatus. The method includes executing a matching cost computation on a first image and a second image to obtain a plurality of cost values of each of a plurality of pixels of the first image corresponding to the second image within a disparity search range, wherein a size of the first image is identical to that of the second image; selecting an extreme value from the cost values corresponding to each of the pixels and using the extreme value as a matching cost value to obtain a matching point corresponding to each of the pixels, wherein each of the matching points has a corresponding matching disparity; and using N rows on an x axis as strip-shaped areas, performing scanning from up to down with starting from a first line on a y axis of the strip-shaped areas and after completing scanning the first line, performing scanning from left to right with starting from the next line individually so as to read disparity data of the matching point corresponding to each of the pixels to adjust the matching disparity corresponding to each of the matching points.

To sum up, by the disparity estimation method of stereoscopic images of the present disclosure, computation times of disparity optimization may be reduced, and better matching disparities may be obtained so as to dramatically reduce the computation amount. In addition, the usage of the memory buffers may be reduced as the scan order is improved.

In order to make the aforementioned and other features and advantages of the present disclosure more comprehensible, several embodiments accompanied with figures are described in detail below.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain the principles of the present disclosure.

FIG. 2A~FIG. 2F are schematic diagrams illustrating window ranges applied in aggregation operation according to the first embodiment of the present disclosure.

DESCRIPTION OF EMBODIMENTS

First Embodiment

Figure 1:
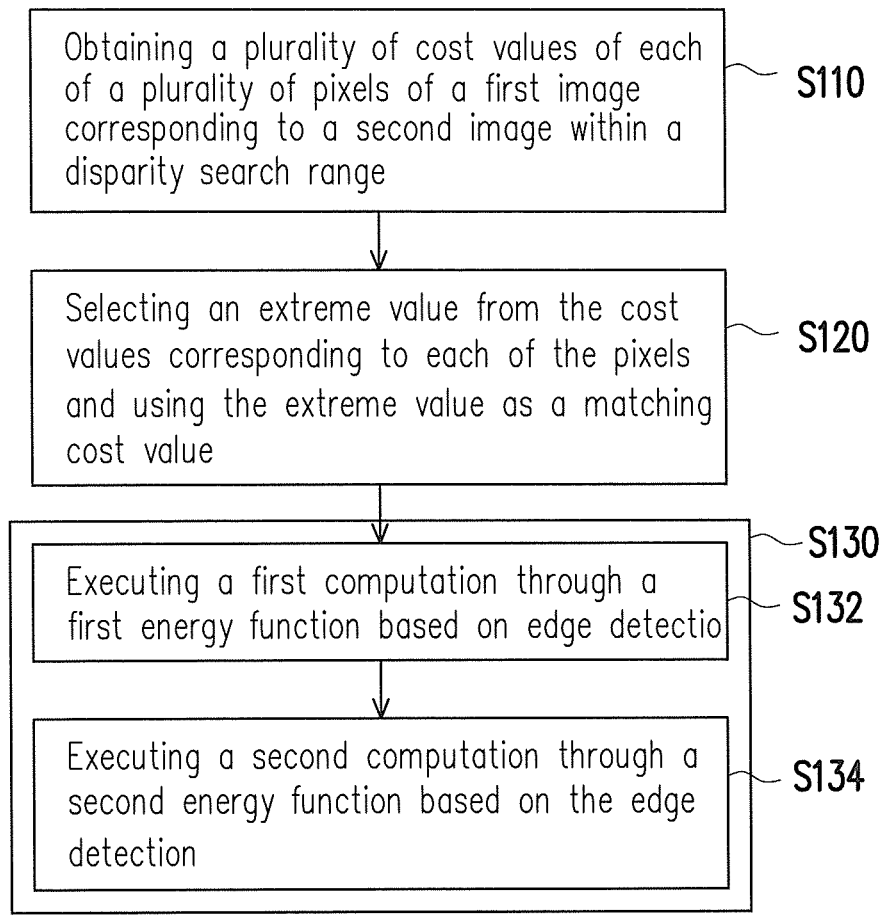
FIG. 1 is a flowchart illustrating a disparity estimation method of stereoscopic images according to the first embodiment of the present disclosure.

FIG. 1 is a flowchart illustrating a disparity estimation method of stereoscopic images according to the first embodiment of the present disclosure. The method is adapted to an electronic apparatus having a computation function. For example, the electronic apparatus includes a processing unit and a storage unit. A plurality of code segments is stored in the storage unit, and the processing unit performs the disparity estimation method by reading the code segments. The disparity estimation method will described as below. In another embodiment, the disparity estimation method may be implemented in a hardware format, such as one or more chips.

With reference to FIG. 1, in step S110, a plurality of cost values of each pixel of a first image corresponding to a second image within a disparity search range is obtained. For example, a matching cost computation is executed on the first image and the second image to obtain the cost values. Here, a size of the first image is identical to that of the second image. To be specific, after the first image and the second image are received by the processing unit, the first image is used as a target image, the second image is used as a reference image, and a disparity search range is configured. The disparity search range includes a plurality of estimated disparities. The disparity search range is configured to find out an optimized matching disparity from the estimated disparities between the two images. An adaptive disparity search range may be configured according to actual tasks. For example, a smaller disparity search range may accelerate an operation speed of a system and reduce a probability of mismatching.

The matching cost computation at least includes a matching cost computation and/or cost aggregation. The matching cost computation calculates differences, such as a color difference, between two images (e.g., a left-eye image and a right-eye image), and the difference is referred to as a cost value. After calculating the differences of pixels between the first image and pixels of the second image, such as calculating all pixels of the first image, a cost cube with a dimension of H×W×DR is obtained, wherein H and W are a length and a width of an image, and DR is a self-defined disparity search range. For example, a point (x,y,z) in the cost cube represents the likelihood between a pixel (x,y) of the first image and a pixel (x−z,y) of the second image; alternatively, the point (x,y,z) represents the likelihood between the pixel (x,y) of the first image and a pixel (x+z,y) of the second image.

In the present embodiment, the matching cost computation is executed to calculate cost values obtained by each pixel of the first image relative to the second image under different estimated disparities. For instance, the cost cube may be obtained by using match metrics, such as an absolute difference (AD) algorithm, a square difference (SD) algorithm, a pixel dissimilarity measure (PDM) algorithm, a normalized cross correlation (NCC) algorithm, a rank algorithm, a census algorithm and so forth.

Besides, in order to enhance a relation between the pixels and reliability of the cost values, a step of cost aggregation may be further performed after the cost values of each pixel is obtained. However, in other embodiments, the cost aggregation operation may also be unnecessarily performed. The cost aggregation operation is performed to adjust the cost value according to cost values of adjacent pixels. For example, the cost value adjustment is performed according to the cost values of the rest of the pixels within a window, such as by calculating based on formula (1) as follows:

$$C_{arrf}(x, y, d) = \frac{\sum_{(i,j) \in win} C(i, j, d) \times W(i, j)}{\sum_{(i,j) \in win} W(i, j)} \quad (1)$$

Figures 2A, 2B, 2C:
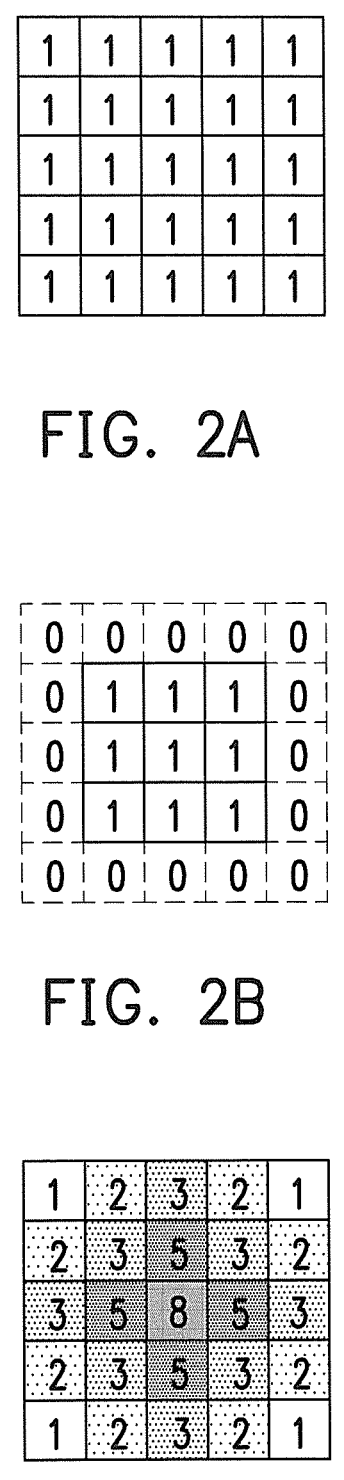
Figures 2D, 2E, 2F:
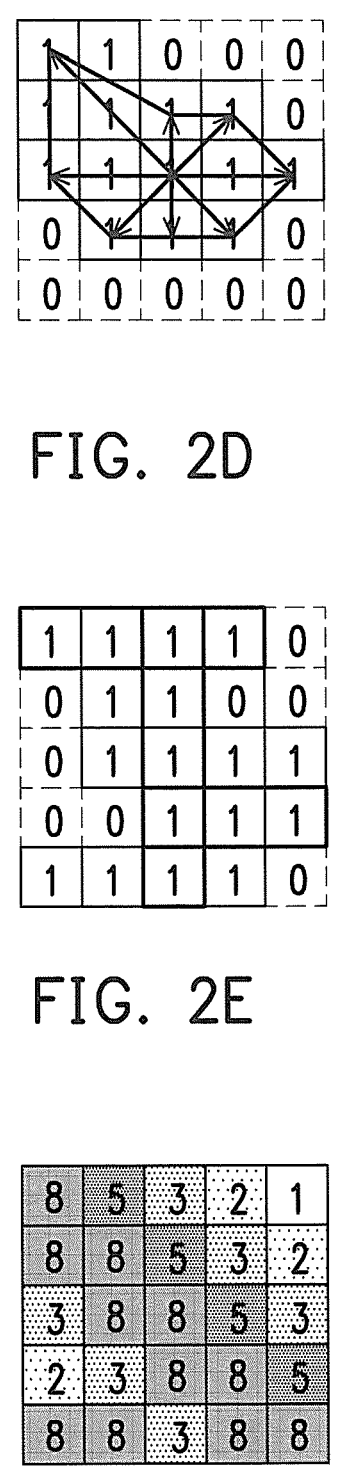

In the formula (1), C(i,j,d) represents a cost value obtained by executing the matching cost computation, $C_{arrf}$(x,y,d) represents a cost value through the cost aggregation, W(i,j) is a weight of a pixel (i,j), d represents an estimated disparity within the disparity search range, and win represents a range of adjacent pixels to be calculated in various weight calculations, such as calculating the pixels within the same window range. For example, FIG. 2A~FIG. 2F are schematic diagrams illustrating window ranges applied in the aggregation operation according to the first embodiment of the present disclosure. FIG. 2A illustrates that the weight W(i,j) is calculated by using a uniform weight, FIG. 2B illustrates that the weight W(i,j) is calculated by using a uniform weight with adaptive window size, FIG. 2C illustrates that the weight W(i,j) is calculated by using a Gaussian weight, FIG. 2D illustrates that the weight W(i,j) is calculated by using an adaptive polygon weight, FIG. 2E illustrates that the weight W(i,j) is calculated by using a cross-based weight, and FIG. 2F illustrates that the weight W(i,j) is calculated by using an adaptive support weight. For instance, referring to FIG. 2D, an accumulated cost value of a central pixel (x, y) is adjusted according to cost values of adjacent pixels in four directions or eight directions, where win is referred to the pixels within the window, and thus, if the central pixel is (0,0), for example, then W(1,0) is 1, W(2,0) is 1 and so on. Therein, since a value of W(2,1) is 0, a value of $C_{arrf}$(x,y,d) will not be influenced.

In another embodiment, the cost values of each pixel are calculated by using the sum of absolute difference (SAD) algorithm, and then temporal cost consistency is calculated so as to obtain adjusted cost values. In this embodiment, the cost aggregation operation is not performed. The method to obtain the cost values by using the SAD algorithm achieves better performance with fewer resources as compared with other complicate methods. Besides, since the cost aggregation operation is unnecessarily performed, a 5×5 window is utilized for calculation, as shown in formula (1-a), where formula (1-b) is utilized to calculate the temporal cost consistency.

$$SAD(x, y, d) = \sum_{\substack{x-2 \leq i \leq x+2 \\ y-2 \leq j \leq y+2}} |I_{tar}(i, j) - I_{ref}(i+d, j)| \quad (1\text{-}a)$$

$$TEMP(x, y, d) = cost(x, y, d) + k \times [D_{pre}(x, y) - d] \quad (1\text{-}b)$$

Therein, $I_{tar}$ represents pixel values of the first image, $I_{ref}$ represents pixel values of the second image. Cost(x,y,d) represents a cost value obtained by calculating formula (1-a), $D_{pre}(x,y)$ represents a disparity of the pixel (x,y), k is a constant, and a value calculated by using TEMP is a cost value for subsequent calculations.

In step S120, an extreme value, such a minimum value, is selected from the cost values corresponding to each pixel and used as a matching cost value so as to obtain matching points corresponding to the pixels. Each matching point has a corresponding matching disparity. Here, based on a winner-take-all (WTA) method, a maximum value or a minimum value is selected from all the cost values for each pixel within the disparity search range. For instance, in the present embodiment, the minimum value is selected from the cost values corresponding to each pixel and used as the matching cost value, and the point having the minimum value is used as the corresponding matching point.

After the matching point corresponding to each pixel, in step S130, the matching disparity corresponding to each matching point is adjusted according to a scan order. In detail, the step S130 at least includes two iteration calculations, i.e., step S132 and step S134. A depth value of a pixel located at an object edge has higher calculation reliability than that of a pixel not located at the object edge. Thus, the pixels belonging to the object edge and those not belonging to the object edge are adjusted by different adjustment methods accompanying with the use of the edge detection algorithm. Accordingly, the matching disparity corresponding to each matching point is further adjusted. Step S132 and step S134 are described as follows.

In step S132, a first computation is executed through a first energy function based on the edge detection. Here, disparity data of the matching point corresponding to each pixel is read according to the scan order, and the first computation is executed through the first energy function based on the edge detection according to the currently read disparity data of a pixel and the read disparity data of the adjacent pixels. For example, whether the pixel is an object edge is determined by using the edge detection algorithm to decide a weight value of the first energy function.

Here, when executing the first computation, only the disparity data of the currently scanned pixel and the disparity data of two pixels adjacent thereto in two directions may be learned. Accordingly, the first energy function is shown as, for example, formula (2) as below.

$$E1(x, y) = \text{cost}(x, y) + \quad (2)$$
$$H1 \times \text{abs}(d(x, y), d(x-1, y)) + V1 \times \text{abs}(d(x, y), d(x, y-1))$$

Therein, E1(x,y) represents a first energy value of a pixel (x,y), cost(x,y) represents a matching cost value of the pixel (x,y), d(x,y) represents a corresponding matching disparity of the pixel (x,y), d(x−1,y) represents a corresponding matching disparity of a pixel (x−1,y), and d(x,y−1) represents a corresponding matching disparity of the pixel (x,y−1).

Meanwhile, the function abs( ) may be any numeric computation, such as an computation for calculating a difference between the matching disparity of two adjacent pixels, and thus, formula (2) may be replaced with the following formula (2').

$$E1(x, y) = \text{cost}(x, y) + \quad (2')$$
$$H1 \times (d(x-1, y) - d(x, y)) + V1 \times d(x, y-1) - d(x, y))$$

H1 and V1 respectively represent weight values, which are decided by determining whether the pixel (x,y) is an object edge by using the edge detection algorithm (e.g., a Sobel algorithm). In this case, for example, two sets of weight values may be pre-determined. If the pixel (x,y) is an object edge, the values of H1 and V1 are configured as a first set of weight values. If the pixel (x,y) is not an object edge, the values of H1 and V1 are configured as a second set of weight values.

Alternatively, the weight values H1 and V1 may be calculated by using functions. For example, since information regarding edge values is important, the weight values may be more sensitive to a value of a color difference by using a linear function. In contrast, the weight not belonging to the edge area is calculated by using a step function so as to have the same matching disparity. The weight value H1 is calculated by formulas (3-1) or (3-2) as follows, and the weight value V1 is calculated by formulas (4-1) or (4-2) as follows.

$$\begin{cases} H1(x, y) = 8 + |I(x, y) - I(x-1, y)|, \text{edge}(x, y) = \text{true} & (3\text{-}1) \\ H1(x, y) = 8 + 8 \times (|I(x, y) - I(x-1, y)|), \text{otherwise} & (3\text{-}2) \end{cases}$$

$$\begin{cases} V1(x, y) = 8 + |I(x, y) - I(x, y-1)|, \text{edge}(x, y) = \text{true} & (4\text{-}1) \\ V1(x, y) = 8 + 8 \times (|I(x, y) - I(x, y-1)|), \text{otherwise} & (4\text{-}2) \end{cases}$$

Therein, I(x,y), I(x−1,y) and I(x,y−1) respectively represent pixel values of the pixels (x,y), (x−1,y) and (x,y−1). If the pixel (x,y) is the object edge, the weight values H1 and V1 are decided by formulas (3-1) and (4-1). If the pixel (x,y) is not the object edge, the weight values H1 and V1 are decided by formulas (3-2) and (4-2). Additionally, when the pixel (x,y) is not the object edge, the weight values H1 and V1 may be further limited to being decided by using formulas (3-2) and (4-2) only when a pixel value difference between the two adjacent pixel is less than 16, such as by using H1(x,y)=8+8×(if|I(x,y)−I(x−1,y)|<16). Meanwhile, if the pixel value difference between two adjacent pixels is greater than 16, the pixel (x,y) is determined as belonging to the object edge. Although the weight values H1 and V1 are calculated by using the same formula in the present embodiment, the present disclosure is not limited thereto. In another embodiment, H1 and V1 may be calculated by using different formulas. For example, the weight value H1 is used for the weight of a difference between I(x,y) and I(x−1,y), while the weight value V1 is used for the weight of a difference between I(x,y) and I(x,y−1). In still another embodiment, the weight of the difference between the I(x,y) and I(x,y−1) may be increased to emphasize that the difference between the I(x,y) and I(x,y−1) has a higher proportion in E1(x,y), such as by using V1(x,y)=9+|I(x,y)−I(x,y−1)|, edge(x,y)=true.

Then, in step S134, a second computation is executed through a second energy function based on the edge detection. Accordingly, the second computation is executed through the second energy function based on the edge detection according to the disparity data among the currently processed pixel and pixels adjacent thereto.

Here, when the execution of the first computation on a row of pixels is completed, and starts from the next row of pixels, the second computation may be executed on the row which has completed the first computation. When executing the second computation, the disparity data of four adjacent pixels in four directions (i.e., the upper, lower, left and right directions) may be learned. Accordingly, the second energy function is shown as the following formula (5).

$$E2(x, y) = \text{cost}(x, y) + \qquad (5)$$
$$H1 \times \text{abs}(d(x, y), d(x-1, y)) + V1 \times \text{abs}(d(x, y), d(x, y-1)) +$$
$$H2 \times \text{abs}(d(x, y), d(x+1, y)) + V2 \times \text{abs}(d(x, y), d(x, y+1))$$

The second energy function is different from the first energy function that only the upper pixel, (x,y−1) and the left pixel (x−1,y) adjacent to pixel (x,y) are considered in the first energy function, and the lower pixel (x,y+1) and the right pixel (x+1,y) adjacent of the pixel (x,y) are further considered in the second energy function. Therein, E2(x,y) represents a second energy value of the pixel (x,y), d(x+1,y) represents a corresponding matching disparity of the pixel (x+1,y), and d(x,y+1) represents a corresponding matching disparity of the pixel (x,y+1).

In the present embodiment, the difference computation of the matching disparities among the adjacent pixels is configured as the function abs( ), and thus, formula (5) may be replaced with formula (5') as follows.

$$E2(x, y) = \text{cost}(x, y) + \qquad (5')$$
$$H1 \times (d(x-1, y) - d(x, y)) + V1 \times d(x, y-1) - d(x, y)) +$$
$$H2 \times (d(x+1, y) - d(x, y)) + V2 \times d(x, y+1) - d(x, y))$$

Therein, H2 and V2 represent weight values decided by determining whether the pixel (x,y) is the object edge by using the edge detection algorithm (e.g., the Sobel algorithm). Like the aforementioned design of the weight values H1 and V1, two sets of weight values may also be pre-determined in this case. If the pixel (x,y) is the object edge, the values of H2 and V2 are configured as a first set of weight values. If the pixel (x,y) is not an object edge, the values of H2, V2 are configured as a second set of weight values. Alternatively, the weight values H2 and V2 may be calculated by using functions. The weight value H2 is calculated by using formulas (6-1) or (6-2) as follows, and the weight value V2 is calculated by using formulas (7-1) or (7-2) as follows. As in the former description regarding the weight values V1 and H1, the weight values H2 and V2 are calculated by using the same formula in the present embodiment, but the present disclosure is not limited thereto. In another embodiment, H2 and V2 may be calculated by using different formulas, which are not limited by the present disclosure herein. The use of formulas depends on the weight in which direction is to be emphasized and whether it is the edge value.

$$\begin{cases} H2(x, y) = 8 + |I(x, y) - I(x+1, y)|, \text{edge}(x, y) = \text{true} & (6\text{-}1) \\ H2(x, y) = 8 + 8 \times (|I(x, y) - I(x+1, y)|), \text{otherwise} & (6\text{-}2) \end{cases}$$

$$\begin{cases} V2(x, y) = 8 + |I(x, y) - I(x, y+1)|, \text{edge}(x, y) = \text{true} & (7\text{-}1) \\ V2(x, y) = 8 + 8 \times (|I(x, y) - I(x, y+1)|), \text{otherwise} & (7\text{-}2) \end{cases}$$

I(x+1,y) and I(x,y+1) respectively represent pixel values of the pixels I(x+1,y) and (x,y+1). If the pixel (x,y) is the object edge, the weight values H2 and V2 are decided by using formulas (6-1) and (7-1). If the pixel (x,y) is not the object edge, the weight values H2 and V2 are decided formulas (6-2) and (7-2). Additionally, when the pixel (x,y) is not the object edge, the weight values H2 and V2 may be further limited to being decided by using formulas (6-2) and (7-2) only when a pixel value difference between the two adjacent pixel is less than 16. Meanwhile, if the pixel value difference between two adjacent pixels is greater than 16, the pixel (x,y) is determined as belonging to the object edge.

Figure 3:
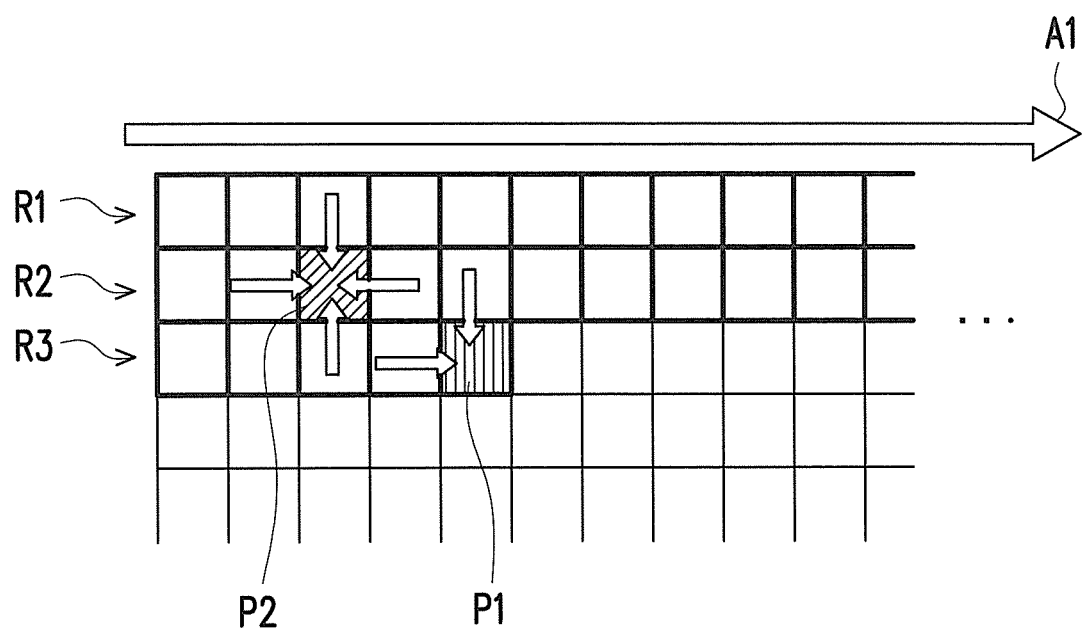
FIG. 3 is a schematic diagram illustrating the scan order of the first embodiment according to the present disclosure.

An embodiment regarding the scan order will be illustrated hereinafter. FIG. 3 is a schematic diagram illustrating the scan order of the first embodiment of the present disclosure. Here, the scan order is a raster scan order. In FIG. 3, a part of the matching disparities is illustrated. Here, starting from a row R1 (i.e., the first row on an x axis, the scanning operation is performed from left to right (i.e., along a scan direction A1). After the scanning operation of the row R1 is completed, the scanning operation is performed on the next row, i.e., a row R2, and so on until the scanning operation is performed on all rows. In the present embodiment, the scanning operation may be performed for twice. Namely, when being completed on the row R1 and starts on the row R2, the scanning operation may be performed again on the row R1 to execute the second computation.

Here, when performing the scanning operation for the first time, i.e., executing the first computation, if a pixel P1 (for the first computation) is the pixel where the first computation is currently executed, the part framed by bold lines in FIG. 3 represents the pixels whose disparity data is read, which are the pixels where the first computation is executed. Therefore, when executing the first computation on the pixel P1, only the disparity data of the upper and the left pixels adjacent to the pixel P1 may be learned, while the disparity data of the right and the lower pixels adjacent to the pixel P1 may not be learned due to being unread yet.

When the first computation is completed on the row R1 and starts from the row R2, the second computation may start from the row R1. Accordingly, the first computation and the second computation may be executed simultaneously. For example, when the first computation is executed on the pixel P1, the second computation also starts to be executed on a pixel P2. At this time, since the first computation is already executed on the pixel P2, the disparity data of the upper, the lower, the left and the right pixels adjacent to the pixel P2 is loaded into a memory buffer, such that the second computation may be executed according to the disparity data of the four pixels adjacent to the pixel P2 in the four directions.

Accordingly, in the aforementioned embodiment, a better matching disparity may be obtained by the two computations by using the raster scan order. Further, comparing to the conventional method in which data of all pixels should be stored, in the method of the present disclosure, data amount of the pixels that actually has to be continuously retained is relatively less since the computation does not have to wait until the whole image is loaded, but executes the two computations by utilizing the feature of loading the data row by row instead. As a result, spaces used by the buffer may be dramatically reduced and so may the computation times. In order to reduce the spaces used by the buffer, a strip-based scan order may further substitute for the raster scan order. Namely, by using N rows on the x axis as strip-shaped areas, the scanning operation is performed from up to down with starting from the first line of the y axis. After scanning the first line, the scanning operation is performed from left to right with starting from the next line. The former half of the N rows overlap a former strip-shaped area, and the later half of the N rows overlap a later strip-shaped area, and an example thereof will be illustrated hereinafter.

Figure 4A:
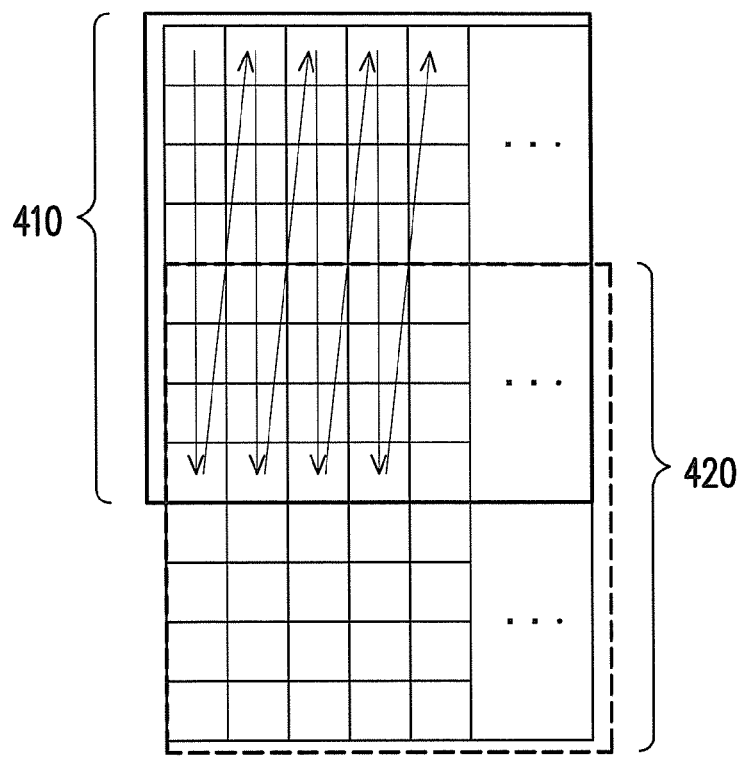
FIG. 4A and FIG. 4B are schematic diagrams illustrating operations of the strip-based scan order according to the first embodiment of the present disclosure.
Figure 4B:
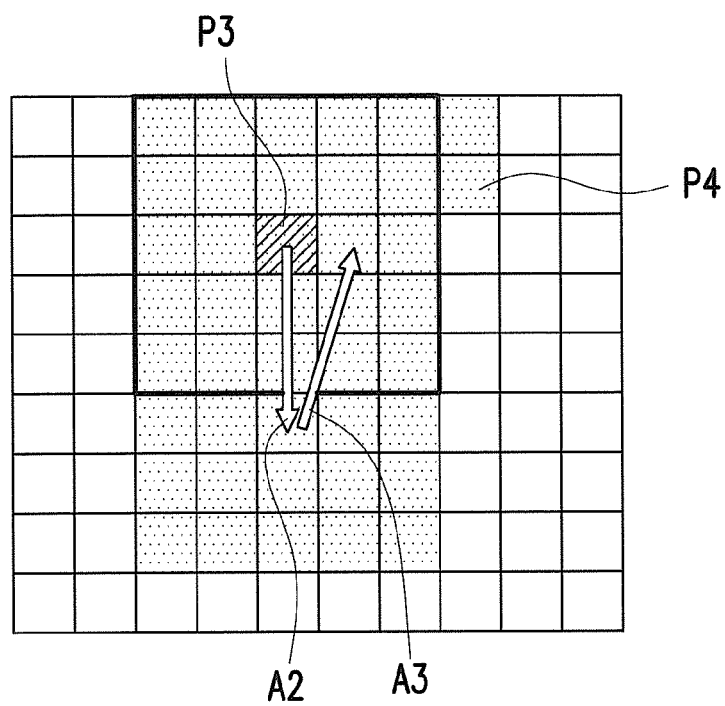

FIG. 4A and FIG. 4B are schematic diagrams illustrating operations of the strip-based scan order according to the first embodiment of the present disclosure. In the present embodiment, 8 rows in the x axis are used as a strip-shaped area. Referring to FIG. 4A, a later half of a strip-shaped area 410 overlaps a former part of the next strip-shaped area 420, while a former half of the strip-shaped area 420 overlaps the later half of the former strip-shaped area 410. In other words, except for the first and the last strip-shaped areas, the former 4 row in each strip-shaped area overlap its former strip-shaped area, and the later 4 rows in each strip-shaped area overlap its later strip-shaped area. Besides, the scanning operation is performed from up to down and from left to right, as shown by arrows in FIG. 4A.

Afterward, referring to FIG. 4B, when calculating pixels in a strip-shaped area, the calculation is performed by using a 5×5 window according to an order shown by arrows A2 and A3. In this case, a pixel P3, for example, is a target of the currently executed computation, while a pixel P4 is a pixel currently reading the data.

In light of the above, in the scenario where the raster scan order is used, the computation based on the window requires row buffers, and a number of the row buffers is decided by the window size. In contrast, the computation according to the strip-based scan order does not require using the row buffers so as to reduce the usage of the buffers.

Second Embodiment

Figure 5:
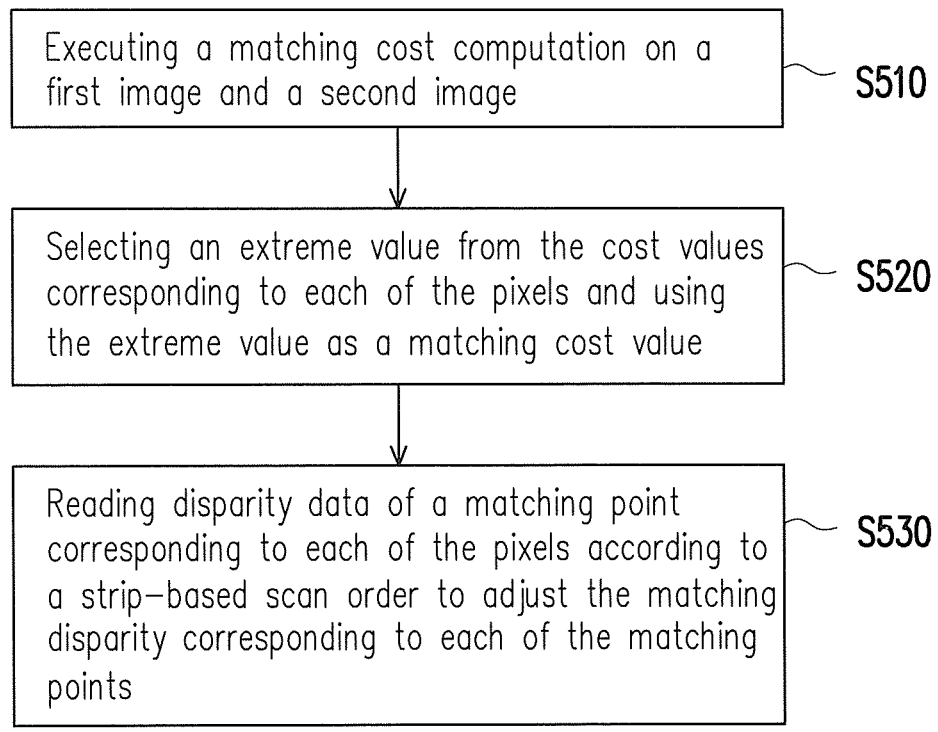
FIG. 5 is a flowchart illustrating a disparity estimation method of stereoscopic images according to the second embodiment of the present disclosure.

FIG. 5 is a flowchart illustrating a disparity estimation method of stereoscopic images according to the second embodiment of the present disclosure. The method is adapted to an electronic apparatus having a computation function. For instance, the electronic apparatus includes a processing unit and a storage unit. A plurality of code segments is stored in the storage unit, and the processing unit performs the disparity by reading the code segments. The disparity estimation method will described as below.

With reference to FIG. 5, in step S510, a matching cost computation is executed on a first image and a second image so as to obtain a plurality of cost values of each pixel of the first image corresponding to the second image within a disparity search range. A size of the first image is identical to that of the second image. Then, in step S520, an extreme value is selected from the cost values corresponding to each pixel and used as a matching cost value so as to obtain matching points corresponding to the pixels. Besides, detailed description in connection with steps S510 and S520 may refer to that in connection with steps S110 and S120 above, and will not be repeated hereinafter.

Then, in step S530, disparity data of the matching point corresponding to each pixel is read according to a strip-based scan order to adjust a matching disparity corresponding to each matching point. The strip-based scan order is to, by using N rows on the x axis as by using N rows on the x axis as a strip-shaped area, perform the scanning operation from up to down in the strip-shaped area with starting from the first line of the y axis and after completing scanning the first line, the scanning operation is performed individually from left to right with starting from the next line. Thereby, the disparity data of the matching point corresponding to each pixel is read one by one. Moreover, the strip-shaped area at least includes 3 rows, that is, N is greater than or equal to 3. Description in connection with the strip-based scan order may refer to that with reference to FIG. 4A and FIG. 4B.

In the present embodiment, the step of adjusting the matching disparity corresponding to each matching point may be performed by two computations through a first energy function and a second energy function as the first embodiment, of which description may refer to that of step S130, and will not be repeated any longer. Moreover, the matching disparity may be adjusted by using other currently existing algorithms, such as a GC algorithm, a BP algorithm, a DP algorithm, and so forth, which constructs no limitations to the present disclosure.

Based on the above, the present disclosure adopts the energy functions based on the edge detection to adjust the disparities according to the raster scan order and further reduces the usage of the memory as less as possible with the design of the strip-based scan order as well as the usage of bandwidths with the strip-based architecture. Accordingly, through the implementations according to the aforementioned embodiments, depth maps adaptive for synthesis can be provided under the premise of real-time processing and low resource usage.

Although the disclosure has been described with reference to the above embodiments, it will be apparent to one of the ordinary skill in the art that modifications to the described embodiment may be made without departing from the spirit of the disclosure. Accordingly, the scope of the disclosure will be defined by the attached claims not by the above detailed descriptions.

What is claimed is:

1. A disparity estimation method of stereoscopic images for an electronic apparatus, comprising:
    obtaining a plurality of cost values of each of a plurality of pixels of a first image corresponding to a second image within a disparity search range, wherein a size of the first image is identical to that of the second image;
    selecting an extreme value from the cost values corresponding to each of the pixels and using the extreme value as a matching cost value to obtain a matching point corresponding to each of the pixels, wherein each of the matching points has a corresponding matching disparity; and
    adjusting the matching disparity corresponding to each of the matching points according to a scan order, and the step comprising:
        reading disparity data of the matching point corresponding to each of the pixels individually according to the scan order and executing a first computation through a first energy function based on edge detection according to the read disparity data of a current pixel and the read disparity data of pixels adjacent to the current pixel; and
        executing a second computation through a second energy function based on the edge detection according to the disparity data of a currently processed pixel and the disparity data of the pixels adjacent to the currently processed pixel.

2. The method as claimed in claim 1, wherein
    the step of executing the first computation comprises:
        executing the first computation on a pixel (x,y) through the first energy function based on the edge detection according to the read disparity data of the current pixel (x,y) with disparity data of a pixel (x−1,y) and a pixel (x,y−1); and
    the step of executing the second computation comprises:
        executing the second computation on the pixel (x,y) through the second energy function based on the edge detection according to disparity data of the currently processed pixel (x,y) with disparity data of the pixel (x−1,y), the pixel (x,y−1), a pixel (x+1,y) and a pixel (x,y+1).

3. The method as claimed in claim 2, wherein the first energy function based on the edge detection is $$E1(x, y) = \\ \text{cost}(x, y) + H1 \times \text{abs}(d(x, y), d(x-1, y)) + V1 \times \text{abs}(d(x, y), d(x, y-1));$$

and
the second energy function based on the edge detection is $$E2(x, y) = \text{cost}(x, y) + \\ H1 \times \text{abs}(d(x, y), d(x-1, y)) + V1 \times \text{abs}(d(x, y), d(x, y-1)) + \\ H2 \times \text{abs}(d(x, y), d(x+1, y)) + V2 \times \text{abs}(d(x, y), d(x, y+1)),$$

wherein E1(x,y) represents a first energy value of the pixel (x,y), cost(x,y) represents a matching cost value of the pixel (x,y), d(x,y) represents a corresponding matching disparity of the pixel (x,y), d(x−1,y) represents a corresponding matching disparity of the pixel (x−1,y), d(x,y−1) represents a corresponding matching disparity of the pixel (x,y−1), E2(x,y) represents a second energy value of the pixel (x,y), d(x+1,y) represents a corresponding matching disparity of the pixel (x+1,y), and d(x,y+1) represents a corresponding matching disparity of the pixel (x,y+1), and wherein H1, V1, H2 and V2 respectively represent weight values and a step of deciding the weight values comprises:
determining whether the pixel (x,y) is an object edge by using an edge detection algorithm to decide the weight value.

4. The method as claimed in claim 3, wherein the step of determining whether the pixel (x,y) is the object edge by using the edge detection algorithm to decide the weight value comprises:
when the pixel (x,y) is the object edge, formulas to decide the weight value comprises:

$H1(x,y)=8+|I(x,y)-I(x-1,y)|;$ $H2(x,y)=8+|I(x,y)-I(x+1,y)|;$ $V1(x,y)=8+|I(x,y)-I(x,y-1)|;$ and $V2(x,y)=8+|I(x,y)-I(x,y+1)|,$ wherein I(x,y), I(x−1,y), I(x,y−1), I(x+1,y) and I(x,y+1) respectively represent pixel values of the pixels (x,y), (x−1,y), (x,y−1), I(x+1,y) and (x,y+1); and
if the pixel (x,y) is not the object edge, formulas to decide the weight value comprise:

$H1(x,y)=8+8\times(|I(x,y)-I(x-1,y)|);$ $H2(x,y)=8+8\times(|I(x,y)-I(x+1,y)|);$ $V1(x,y)=8+8\times(|I(x,y)-I(x,y-1)|);$ and $V2(x,y)=8+8\times(|I(x,y)-I(x,y+1)|).$ 5. The method as claimed in claim 1, wherein the scan order is a raster scan order.

6. The method as claimed in claim 1, wherein the scan order is an order of, by using N rows on an x axis as strip-shaped areas, performing scanning from up to down with starting from a first line on a y axis of the strip-shaped area, and after completing scanning the first line, performing scanning from left to right with starting from the next line individually, wherein the former half part of the N rows overlap a former strip-shaped area, and the later half part of the N rows overlap a later strip-shaped area.

7. A disparity estimation method of stereoscopic images for an electronic apparatus, comprising:
executing a matching cost computation on a first image and a second image to obtain a plurality of cost values of each of a plurality of pixels of the first image corresponding to the second image within a disparity search range, wherein a size of the first image is identical to that of the second image;
selecting an extreme value from the cost values corresponding to each of the pixels and using the extreme value as a matching cost value to obtain a matching point corresponding to each of the pixels, wherein each of the matching points has a corresponding matching disparity; and
using N rows on an x axis as strip-shaped areas, performing scanning from up to down with starting from a first line on a y axis of the strip-shaped areas, and after completing scanning the first line, performing scanning from left to right with starting from the next line individually so as to read disparity data of the matching point corresponding to each of the pixels to adjust the matching disparity corresponding to each of the matching points.

8. The method as claimed in claim 7, wherein the former half part of the N rows overlap a former strip-shaped area, the later half part of the N rows overlap a later strip-shaped area, and the matching disparity corresponding to each of the matching points is adjusted by using window blocks.

9. The method as claimed in claim 7, wherein the step of adjusting the matching disparity corresponding to each of the matching points comprises:
executing a first computation through a first energy function according to the read disparity data of a current pixel and the read disparity data of pixels adjacent to the current pixel; and
executing a second computation through a second energy function according to the disparity data of a currently processed pixel and the disparity data of the pixels adjacent to the currently processed pixel.

10. The method as claimed in claim 9, wherein
the step of executing the first computation comprises:
executing the first computation on a current pixel (x,y) through the first energy function according to the read disparity data of the current pixel (x,y) with the disparity data of a pixel (x−1,y) and a pixel (x,y−1); and
the step of executing the second computation comprises:
executing the second computation on the pixel (x,y) through the second energy function according to the currently processed disparity data of the pixel (x,y) with the disparity data of the pixel (x−1,y), the pixel (x,y−1), a pixel (x+1,y) and a pixel (x,y+1).

11. The method as claimed in claim 10, wherein the first energy function based on the edge detection is $$E1(x, y) = \\ \text{cost}(x, y) + H1 \times \text{abs}(d(x, y), d(x-1, y)) + V1 \times \text{abs}(d(x, y), d(x, y-1));$$

and the second energy function is $$E2(x, y) = \text{cost}(x, y) + H1 \times \text{abs}(d(x, y), d(x-1, y)) + V1 \times \text{abs}(d(x, y), d(x, y-1)) + H2 \times \text{abs}(d(x, y), d(x+1, y)) + V2 \times \text{abs}(d(x, y), d(x, y+1)),$$

wherein E1(x,y) represents a first energy value of the pixel (x,y), cost(x,y) represents a matching cost value of the pixel (x,y), d(x,y) represents a corresponding matching disparity of the pixel (x,y), d(x−1,y) represents a corresponding matching disparity of the pixel (x−1,y), d(x,y−1) represents a corresponding matching disparity of the pixel (x,y−1), H1, V1, H2 and V2 H1, V1, H2 and V2 respectively represents a weight value, E2(x,y) represents a second energy value of the pixel (x,y), d(x+1,y) represents a corresponding matching disparity of the pixel (x+1,y), and d(x,y+1) represents a corresponding matching disparity of the pixel (x,y+1).

12. The method as claimed in claim 11, further comprising adjusting the matching disparity corresponding to each of the matching points by using an edge detection algorithm, the step comprising:

determining whether the pixel (x,y) is an object edge according to the edge detection algorithm to decide the weight value;

if the pixel (x,y) is the object edge, formulas to decide the weight value comprise:

$H1(x,y)=8+|I(x,y)-I(x-1,y)|;$ $H2(x,y)=8+|I(x,y)-I(x+1,y)|;$ $V1(x,y)=8+|I(x,y)-I(x,y-1)|;$ and $V2(x,y)=8+|I(x,y)-I(x,y+1)|,$ wherein I(x,y), I(x−1,y), I(x,y−1), I(x+1,y) and I(x,y+1) respectively represent pixel values of the pixels (x,y), (x−1,y), (x,y−1), I(x+1,y) and (x,y+1); and if the pixel (x,y) is not the object edge, formulas to decide the weight value comprise:

$H1(x,y)=8+8\times(|I(x,y)-I(x-1,y)|);$ $H2(x,y)=8+8\times(|I(x,y)-I(x+1,y)|);$ $V1(x,y)=8+8\times(|I(x,y)-I(x,y-1)|);$ and $V2(x,y)=8+8\times(|I(x,y)-I(x,y+1)|).$

\* \* \* \* \*